United States Patent
Li et al.

(10) Patent No.: US 12,293,732 B2
(45) Date of Patent: May 6, 2025

(54) CIRCUIT FOR ELIMINATING AFTERIMAGE AND DISPLAY DEVICE

(71) Applicant: HKC CORPORATION LIMITED, Shenzhen (CN)

(72) Inventors: Guangzhao Li, Shenzhen (CN); Sihui Yu, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/795,974

(22) PCT Filed: Dec. 23, 2021

(86) PCT No.: PCT/CN2021/140945
§ 371 (c)(1),
(2) Date: Jul. 28, 2022

(87) PCT Pub. No.: WO2022/179282
PCT Pub. Date: Sep. 1, 2022

(65) Prior Publication Data
US 2024/0296805 A1    Sep. 5, 2024

(30) Foreign Application Priority Data
Feb. 26, 2021 (CN) .......................... 202110217416.9

(51) Int. Cl.
*G09G 3/36* (2006.01)
*H02M 3/07* (2006.01)

(52) U.S. Cl.
CPC ................ *G09G 3/36* (2013.01); *H02M 3/07* (2013.01); *G09G 2320/0257* (2013.01); *G09G 2330/02* (2013.01)

(58) Field of Classification Search
CPC ............. G09G 3/36; G09G 2320/0257; G09G 2330/02; G09G 2330/027; H02M 3/07
See application file for complete search history.

(56) References Cited

U.S. PATENT DOCUMENTS

| 8,188,964 B2 * | 5/2012 | Tsuruta | G09G 3/3696 345/94 |
| 2007/0176866 A1 * | 8/2007 | Hung | G09G 3/3696 345/87 |

(Continued)

FOREIGN PATENT DOCUMENTS

| CN | 1945682 A | 4/2007 |
| CN | 101162567 A | 4/2008 |

(Continued)

OTHER PUBLICATIONS

International Search Report issued on Mar. 1, 2021, in connection with corresponding International Patent Application No. PCT/CN2021/140945; 4 pages.

*Primary Examiner* — Priyank J Shah
(74) *Attorney, Agent, or Firm* — Maier & Maier, PLLC

(57) ABSTRACT

A circuit for eliminating afterimage and a display device. The circuit includes a power supply unit, an afterimage elimination unit and a discharge unit. First and second output ends of the power supply unit are connected with the afterimage elimination unit, respectively. A control end of the discharge unit is configured in electric connection with the control unit, and an execution end of the discharge unit is connected with the first output end of the power supply unit. When the screen is turned off, the control unit outputs a first control signal to the discharge unit. The discharge unit discharges at the first output end of the power supply unit according to the first control signal, so as to expedite a falling of the first voltage output from the first output end of the power supply unit.

14 Claims, 3 Drawing Sheets

(56) References Cited

U.S. PATENT DOCUMENTS

| | | | |
|---|---|---|---|
| 2011/0096052 A1 | 4/2011 | Kim | |
| 2019/0103057 A1* | 4/2019 | Song | G09G 3/3258 |
| 2022/0108659 A1* | 4/2022 | Kim | G09G 3/3674 |

FOREIGN PATENT DOCUMENTS

| | | |
|---|---|---|
| CN | 205986619 U | 2/2017 |
| CN | 106952628 A | 7/2017 |
| CN | 109272967 A | 1/2019 |
| CN | 210575043 U | 5/2020 |
| CN | 212541261 U | 2/2021 |
| CN | 112967692 A | 6/2021 |

* cited by examiner

CIRCUIT FOR ELIMINATING AFTERIMAGE AND DISPLAY DEVICE

CROSS-REFERENCE TO THE RELATED APPLICATIONS

This application is the national phase entry of International Application No. PCT/CN2021/140945, filed on Dec. 23, 2021, which is based upon and claims priority to the Chinese Patent Application No. 202110217416.9, filed on Feb. 26, 2021, the entire contents of which are incorporated herein by reference.

TECHNICAL FIELD

The present application relates to the field of display technologies, and more particularly, to a circuit for eliminating afterimage and a display device.

BACKGROUND

Nowadays, the thin film transistor liquid crystal display (TFT_LCD) has been a common display product, and increasingly used in the field of high-performance displays due to the characteristics of small size, low power consumption, no radiation and relatively low production cost.

After the TFT_LCD screen is turned off, slow discharge of electric charges in the screen causes charge residual, thereby resulting in afterimage on the screen.

SUMMARY

An object of the present application is to provide a circuit for eliminating afterimage and a display device, so as solve the problem of afterimage caused by slow discharge when the screen is turned off.

In a first aspect, an embodiment of the present application provides a circuit for eliminating afterimage. The circuit includes a power supply unit and an afterimage elimination unit. A first output end and a second output end of the power supply unit are electrically connected to the afterimage elimination unit, respectively. The afterimage elimination unit is configured to discharge electric charge in the screen by means of a second voltage output from the second output end of the power supply unit, when a first voltage output from the first output end of the power supply unit is less than a first preset voltage. The circuit further includes a discharge unit, a control end of the discharge unit is configured in electric connection with a control unit, and an execution end of the discharge unit is electrically connected to the first output end of the power supply unit.

The control unit is configured to output a first control signal when the screen is turned off; the discharge unit is configured to discharge at the first output end of the power supply unit according to the first control signal to reduce the first voltage.

In an exemplary embodiment of the first aspect, the discharge unit includes a first resistor, a second resistor and a switch.

A first end of the first resistor serves as the execution end of the discharge unit and is electrically connected to the first output end of the power supply unit. A second end of the first resistor is electrically connected to a drain of the switch. A gate of the switch and a first end of the second resistor are connected in common as the control end of the discharge unit, to be electrically connected to the control unit. A source of the switch and a second end of the second resistor are both grounded.

In an exemplary embodiment of the first aspect, when the screen is working, a second control signal is output by the control unit, and the second control signal is a low-level signal.

In an exemplary embodiment of the first aspect, when the screen is turned off, the first control signal output by the control unit is a high-level signal within a preset time.

In an exemplary embodiment of the first aspect, the preset time is at least 10 ms.

In an exemplary embodiment of the first aspect, the circuit further includes a charge pump unit, a control end of the charge pump unit is configured in electric connection with the control unit, an input end of the charge pump unit is configured in electric connection with a third output end of the power supply unit, and the output end of the charge pump unit is electrically connected to the second output end of the power supply unit.

The charge pump unit is configured to boost an oscillation voltage output from the third output end of the power supply unit to a second preset voltage according to the first control signal, and transmit the second preset voltage to the second output end of the power supply unit.

In an exemplary embodiment of the first aspect, the charge pump unit includes a first diode, a second diode, a third diode, a fourth diode, a fifth diode, a first capacitor, a second capacitor and a third capacitor:

The fifth diode, the first diode, the second diode, the third diode and the fourth diode are sequentially connected in series. An anode of the fifth diode serves as the control end of the charge pump unit and is electrically connected to the control unit. A first end of the first capacitor and a first end of the second capacitor are connected in common as the input end of the charge pump unit, to be electrically connected to the third output end of the power supply unit. A second end of the first capacitor is electrically connected to a cathode of the first diode and an anode of the second diode, respectively. A second end of the second capacitor is electrically connected to a cathode of the third diode and an anode of the fourth diode, respectively. A first end of the third capacitor is electrically connected to a cathode of the second diode and an anode of the third diode, respectively. A second end of the third capacitor is electrically connected to a cathode of the fifth diode and an anode of the first diode, respectively. A cathode of the fourth diode serves as the output end of the charge pump unit and is electrically connected to the second output end of the power supply unit.

In an exemplary embodiment of the first aspect, the charge pump unit further includes a fourth capacitor:

A first end of the fourth capacitor is grounded, and a second end of the fourth capacitor is electrically connected to the cathode of the fourth diode.

In an exemplary embodiment of the first aspect, the oscillation voltage output from the third output end of the power supply unit is switched between 0V and 12V according to a set frequency.

In an exemplary embodiment of the first aspect, when the screen is turned off, a duration of the oscillation voltage output from the third output end of the power supply unit is at least 10 ms.

In an exemplary embodiment of the first aspect, the discharge unit includes a first resistor, a second resistor and a switch;

A first end of the first resistor serves as the execution end of the discharge unit and is electrically connected to the first output end of the power supply unit. A second end of the first resistor is electrically connected to a drain of the switch. A gate of the switch and a first end of the second resistor are connected in common as the control end of the discharge unit, to be electrically connected to the control unit. A source of the switch and a second end of the second resistor are both grounded.

In an exemplary embodiment of the first aspect, when the screen is working, a second control signal is output by the control unit, and the second control signal is a low-level signal.

In an exemplary embodiment of the first aspect, when the screen is turned off, the first control signal output by the control unit is a high-level signal within a preset time.

In an exemplary embodiment of the first aspect, the preset time is at least 10 ms.

In a second aspect, an embodiment of the present application provides a display device, which includes the circuit for eliminating afterimage described in any one of the above embodiments of the first aspect.

Compared with the prior art, embodiments of the present application have the following beneficial effects: The control unit is configured to output a first control signal to the discharge unit when the screen is turned off. The discharge unit is configured to discharge at the first output end of the power supply unit according to the first control signal, so as to expedite a falling of the first voltage output from the first output end of the power supply unit. The afterimage elimination unit is configured to discharge the electric charges in the screen when the first voltage is lower than the first preset voltage. The circuit for eliminating afterimage in accordance with the embodiments of the present application can quickly activate the afterimage elimination unit to perform a discharge for the screen, thereby achieving the effect of afterimage elimination.

DETAILED DESCRIPTION OF THE EMBODIMENTS

Figure 1:
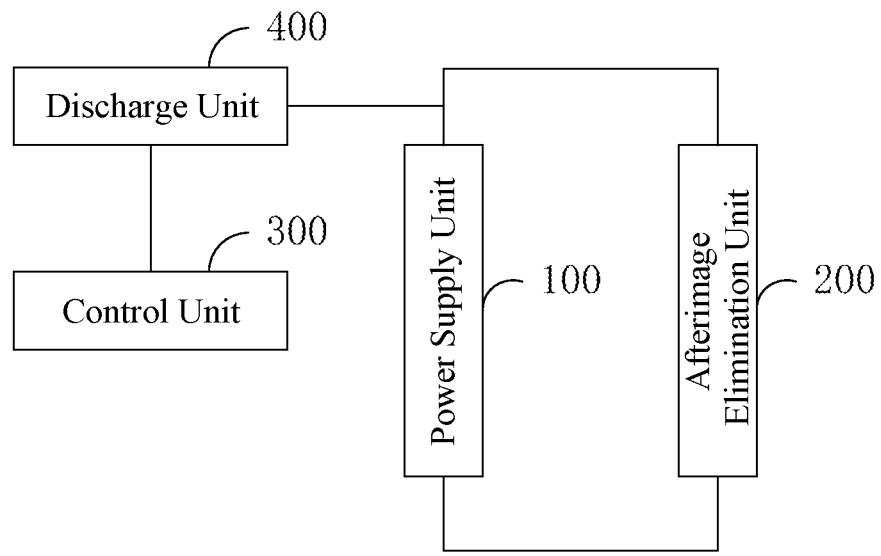
FIG. 1 is a structural block diagram of a circuit for eliminating afterimage in accordance with an embodiment of the present application.

In the following description, for purpose of illustration rather than limitation, specific details such as specific system structures, techniques, etc. are set forth in order to provide a thorough understanding of the embodiments of the present application. However, it will be apparent to those skilled in the art that the present application may be achieved in other embodiments without these specific details. In other instances, detailed descriptions of well-known systems, devices, circuits, and methods are omitted so as not to obscure the description of the present application with unnecessary detail.

It should be understood that the term "comprising", when used in this specification and the appended claims, indicates the presence of the described feature, integer, step, operation, element and/or component, but does not exclude the presence or addition of one or more other features, integers, steps, operations, elements, components and/or combinations thereof.

It should also be understood that the term "and/or", as used in this specification and the appended claims, refers to any combinations of one or more of the associated listed items or all possible combinations thereof, and includes these combinations.

As used in the specification of this application and the appended claims, the term "if" may be contextually interpreted as "when" or "once" or "in response to determining" or "in response to detecting." Similarly, the phrases "if it is determined" or "if [the described condition or event is] detected" may be interpreted, depending on the context, as "once it is determined" or "in response to the determination" or "once [the described condition or event is] detected." or "in response to the detection [of the described condition or event]".

In addition, in the description of the specification of the present application and the appended claims, the terms "first", "second", "third", etc. are only used to distinguish the description, and should not be construed as indicating or implying relative importance.

References to "an/one embodiment" or "some embodiments" as described in this specification of the present application, mean that a particular feature, structure or characteristic described in combination with the embodiment may be included in one or more embodiments of the present application. Thus, appearances of the phrases "in one embodiment," "in some embodiments," "in some embodiments," "in some other embodiments," "in other embodiments," etc. in various places in this specification are not necessarily all refer to the same embodiment, but mean "one or more but not all embodiments" unless specifically emphasized otherwise. The terms "including", "comprising", "having" and their variants mean "including but not limited to" unless specifically emphasized otherwise.

The traditional screen may be equipped with an afterimage elimination unit. After the screen is turned off, and when a first voltage output from a first output end of the power supply unit is fallen to 1.8V, a second voltage at a second output end of the power supply unit is raised to a second preset voltage, so that all thin film transistors in the afterimage elimination unit are in an on state, and thus electric charges in a screen are discharged through the afterimage elimination unit, thereby the afterimage due to a shutdown event is eliminated. However, in the traditional screen, after being turned off, the first voltage is falling slowly to 1.8V, which delays a time for the second voltage to rise to the second preset voltage, and thus causes the afterimage elimination unit to slowly discharge the electric charges in the screen, such that the phenomenon of afterimage will still be occurred in the screen.

In view of the above problem, an embodiment of the present application provides a circuit for eliminating afterimage. In the circuit, a control unit is configured to output a first control signal to a discharge unit when the screen is turned off. The discharge unit is configured to discharge at the first output end of the power supply unit according to the first control signal, so that a first voltage output from the first output end of the power supply unit is rapidly fallen to a first preset voltage (for example, 1.8V), and thereby the second voltage output from the second output end can be quickly raised to a second preset voltage, such that all the thin film transistors in the afterimage elimination unit are in an on state, and thus a discharge of the electric charges in the screen by the afterimage elimination unit can be realized. Therefore, the circuit for eliminating afterimage in accordance with the embodiment of the present application can quickly activate the afterimage elimination unit to perform a discharge for the screen, so as to achieve the effect of improving or eliminating afterimage.

FIG. 1 shows a structural block diagram of a circuit for eliminating afterimage in accordance with an embodiment of the present application. Referring to FIG. 1, the circuit for eliminating afterimage may include a power supply unit 100, an afterimage elimination unit 200 and a discharge unit 400. A first output end and a second output end of the power supply unit 100 are electrically connected to the afterimage elimination unit 200, respectively. A control end of the discharge unit 400 is configured in electric connection with a control unit 300, and an execution end of the discharge unit 400 is electrically connected to the first output end of the power supply unit 100.

In this embodiment, the afterimage elimination unit 200 is configured to discharge electric charges in the screen by means of a second voltage output from the second output end of the power supply unit 100, when a first voltage output from the first output end of the power supply unit 100 is lower than a first preset voltage. The control unit 300 is configured to output a first control signal to the discharge unit 400 when it is detected that the screen is turned off. The discharge unit 400 is configured to discharge at the first output end of the power supply unit 100 according to the first control signal, so as to achieve the effect of rapidly reducing the first voltage.

Specifically, when the screen is turned off, the control unit 300 is configured to output the first control signal to the control end of the discharge unit 400. The discharge unit 400 is configured to discharge at the first output end of the power supply unit 100 according to the first control signal, so that the first voltage output from the first output end of the power supply unit 100 is fallen rapidly to and below the first preset voltage, and thus the afterimage elimination unit 200 can be activated to discharge the electric charges in the screen, thereby achieving the effect of afterimage elimination.

Figure 2:
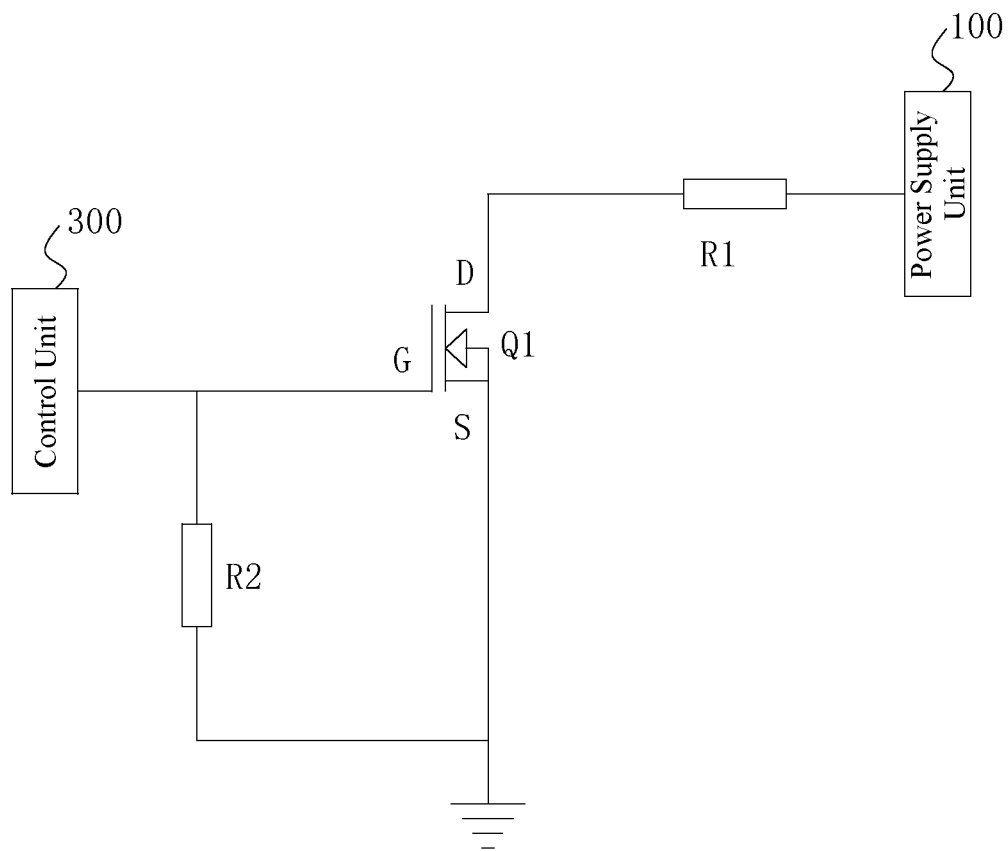
FIG. 2 is a schematic diagram of a circuit connection of a discharge unit in accordance with an embodiment of the present application.

FIG. 2 is a schematic diagram of circuit connection of a discharge unit 400 in accordance with an embodiment of the present application. The discharge unit 400 may include a first resistor R1, a second resistor R2 and a switch Q1. A first end of the first resistor R1 serves as the execution end of the discharge unit 400 and is electrically connected to the first output end of the power supply unit 100, and a second end of the first resistor R1 is electrically connected to a drain of the switch Q1. A gate of the switch Q1 and a first end of the second resistor R2 are connected in common as the control end of the discharge unit 400, to be electrically connected to the control unit 300. A source of the switch Q1 and a second end of the second resistor R2 are both grounded.

Specifically, when the screen is turned off, a first control signal is generated and transmitted by the control unit 300 to the gate of the switch Q1. After the first control signal is received by the gate of the switch Q1, the drain and the source of the switch Q1 are turned on. A discharge at the first output end of the power supply unit 100 is achieved through the first resistor R1, and the voltage at the first output end of the power supply unit 100 is rapidly fallen to and below the first preset voltage. When the voltage at the first output end of the power supply unit 100 is lower than the first preset voltage, the afterimage elimination unit 200 is activated to discharge the electric charges in the screen, thereby achieving the effect of eliminating the afterimage. After the screen is turned off, the discharge unit 400 can expedite a falling of voltage at the first output end of the power supply unit 100, thereby speeding up the activation of the afterimage elimination unit 200, realizing the rapid discharge of the electric charges in the screen, and avoiding the problem of afterimage.

Exemplarily, when the screen is working, a second control signal is output by the control unit 300, and the second control signal is a low-level signal. As the low-level signal is loaded to the gate of the switch Q1, the source and drain of the switch Q1 cannot be turned on. At this time, the discharge unit 400 will not discharge to reduce the voltage at the first output end of the power supply unit 100.

When the screen is turned off, the first control signal output from the control unit 300 is a high-level signal within a preset time. The high-level signal is loaded to the gate of the switch Q1, and then the source and drain of the switch Q1 are driven to be turned on. After the source and drain of the switch Q1 are turned on, the first output end of the power supply unit 100 is discharged through the first resistor R1, so as to realize a rapid falling of voltage at the first output end of the power supply unit 100, thereby speeding up the activation of the afterimage elimination unit 200, realizing rapid discharge of the electric charges in the screen, and avoiding the problem of afterimage.

Exemplarily, when the screen is turned off, a duration of the high-level signal output by the control unit 300 is at least 10 ms, so as to ensure that the discharge unit 400 can have sufficient time to discharge and reduce the voltage at the first output end of the power supply unit 100, and to quickly activate the afterimage elimination unit 200 to discharge the electric charges in the screen.

Figure 3:
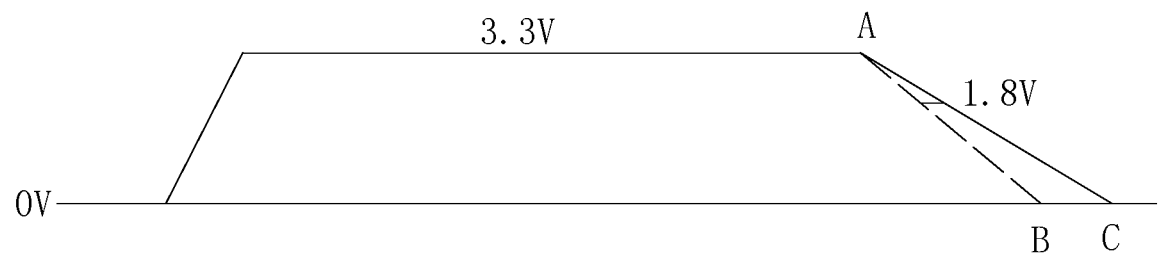
FIG. 3 is a timing diagram showing the voltage of the first output end of the power supply unit according to an embodiment of the present application.

FIG. 3 shows a timing diagram showing the voltage of the first output end of the power supply unit 100 in accordance with an embodiment of the present application. As shown in FIG. 3, when the screen is working normally, the voltage at the first output end of the power supply unit 100 is 3.3V, and when the voltage output from the first end of the power supply unit 100 is less than 1.8V, the afterimage elimination unit 200 can be activated to discharge the electric charges in the screen. After the screen is turned off (point A in FIG. 3), the voltage at the first output end of the power supply unit 100 is fallen gradually. The line segment AC in FIG. 3 represents a voltage variation at the first output end of the power supply unit 100 in the traditional solution, and the line segment AB in FIG. 3 represents a voltage variation at the first output end of the power supply unit 100 under the action of the discharge unit 400. It can be seen from FIG. 3 that under the action of the discharge unit 400, the voltage at the first output end of the power supply unit 100 can quickly reach 1.8V, which speeds up the activation of the afterimage elimination unit 200, realizes the rapid discharge of the electric charges in the screen, and avoids the phenomenon of afterimage.

For a discharge of the electric charges in the screen by the afterimage elimination unit 200, the second voltage output from the second output terminal of the power supply unit 100 needs to reach the second preset voltage to ensure that all thin film transistors in the afterimage elimination unit 200 are in an on state, thereby achieving the discharge of the electric charges inside the screen. If the second voltage is fallen rapidly to or less than the second preset voltage after the screen is turned off, it cannot be ensured that all the thin film transistors in the afterimage elimination unit 200 are in an on state, and thus the afterimage elimination unit 200 is unable to realize a complete discharge of the electric charges inside the screen, resulting in the phenomenon of afterimage.

Figure 4:
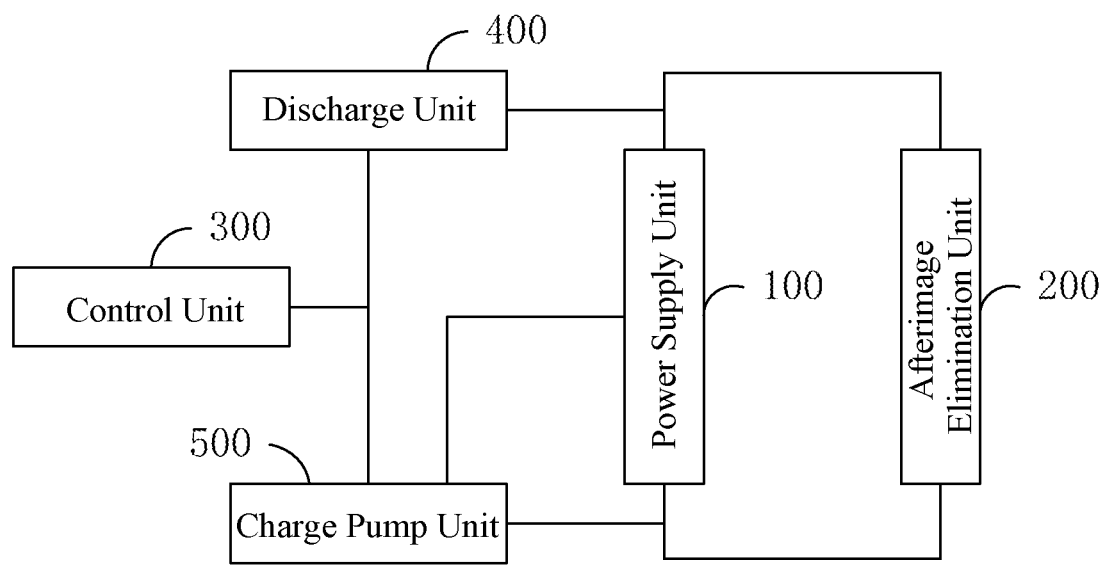
FIG. 4 is a structural block diagram of a circuit for eliminating afterimage in accordance with another embodiment of the present application.

In order to solve the above problem, as shown in FIG. 4, a structural block diagram of a circuit for eliminating afterimage in accordance with another embodiment of the present application is provided. In addition to each unit shown in FIG. 1, the circuit for eliminating afterimage in accordance with this embodiment may also include a charge pump unit 500. Referring to FIG. 4, a control end of the charge pump unit 500 is configured to be in electric connection with the control unit 300, an input end of the charge pump unit 500 is configured to be in electric connection with a third output end of the power supply unit 100, and an output end of the charge pump unit 500 is electrically connected to the second output end of the power supply unit 100.

Specifically, when the screen is turned off, the control unit 300 is configured to generate a first control signal and transmit the same to the control end of the charge pump unit 500. The charge pump unit 500 is configured to boost an oscillation voltage output from the third output end of the power supply unit 100 to a second preset voltage according to the first control signal, and transmit the second preset voltage to the second output end of the power supply unit 100 to ensure that the second voltage output from the second output end of the power supply unit 100 is at the second preset voltage, which enables all thin film transistors in the afterimage elimination unit 200 to be turned on, realizes a complete discharge of the electric charges inside the screen, and avoids the phenomenon of afterimage.

It should be noted that when the screen is turned off, the first control signal output by the control unit 300 is used to control the discharge unit 400 and the charge pump unit 500 simultaneously. The duration of the first control signal output by the control unit 300 is at least 10 ms, so as to ensure that the charge pump unit 500 can provide the second preset voltage for the second output end of the power supply unit 100, so that the afterimage elimination unit 200 can have sufficient time to fully discharge the electric charges in the screen, thereby eliminating the afterimage in screen.

Figure 5:
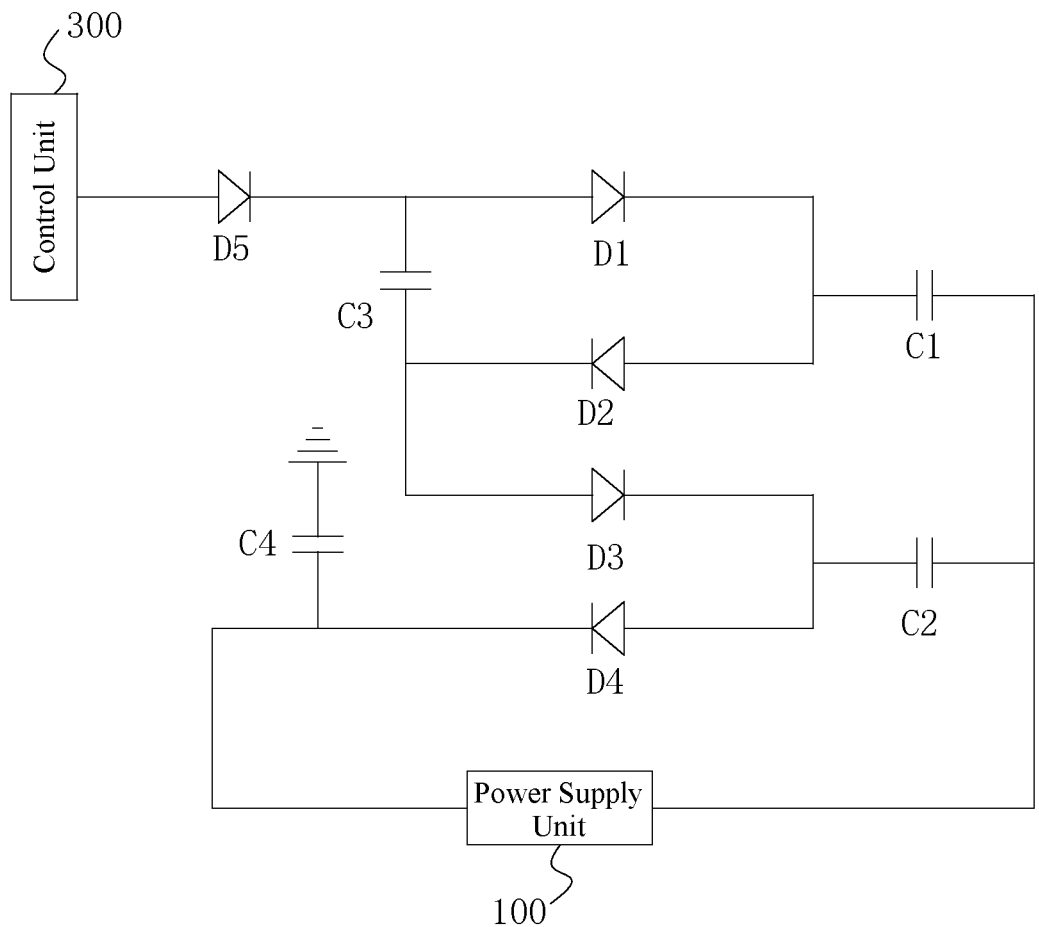
FIG. 5 is a schematic diagram of a circuit connection of a charge pump unit in accordance with an embodiment of the present application.

FIG. 5 shows a schematic diagram of circuit connection of the charge pump unit 500 in accordance with an embodiment of the present application. Referring to FIG. 5, the charge pump unit 500 may include a first diode D1, a second diode D2, a third diode D3, a fourth diode D4, a fifth diode D5, a first capacitor C1, a second capacitor C2 and a third capacitor C3.

In this embodiment, the fifth diode D5, the first diode D1, the second diode D2, the third diode D3 and the fourth diode D4 are subsequently connected in series, and an anode of the fifth diode D5 serves as the control end of the charge pump unit 500 and is electrically connected to the control unit 300. A first end of the first capacitor C1 and a first end of the second capacitor C2 are connected in common as the input end of the charge pump unit 500, to be electrically connected to the third output end of the power supply unit 100. A second end of the first capacitor C1 is electrically connected to a cathode of the first diode D1 and an anode of the second diode D2, respectively, and a second end of the second capacitor C2 is electrically connected to a cathode of the third diode D3 and an anode of the fourth diode D4, respectively. A first end of the third capacitor C3 is electrically connected to a cathode of the second diode D2 and an anode of the third diode D3, respectively, and a second end of the third capacitor C3 is electrically connected to a cathode of the fifth diode D5 and an anode of the first diode D1, respectively. A cathode of the fourth diode D4 serves as the output end of the charge pump unit 500 and is electrically connected to the second output end of the power supply unit 100.

Exemplarily, the oscillation voltage output from the third output end of the power supply unit 100 is switched between 0V and 12V according to a set frequency. When the screen is turned off, the first control signal output by the control unit 300 is 3.3V (a high-level signal). The charge pump unit 500 can output the second preset voltage after two periods of variation of the oscillation voltage.

(1) When the oscillation voltage is 0V, the first diode D1, the second diode D2, the third diode D3, the fourth diode D4 and the fifth diode D5 are turned on, and voltages at the second end of the first capacitor C1 and the second end of the second capacitor C2 are 3.3V, and a voltage at the cathode of the fourth diode D4 is 3.3V. At this time, the voltage output from the output end of the charge pump unit 500 is 3.3V.

(2) When the oscillation voltage is 12V, the second diode D2, the third diode D3, the fourth diode D4 and the fifth diode D5 are turned on, as capacities of the first capacitor C1 and the second capacitor C2 cannot be mutated, the voltages at the second end of the first capacitor C1 and the second end of the second capacitor C2 both become 15.3V (3.3V+12V), and the voltage at the cathode of the fourth diode D4 is 15.3V. At this time, the voltage output from the output end of the charge pump unit 500 is 15.3V.

(3) When the oscillation voltage is 0V, the voltage at the cathode of the fourth diode D4 is still 15.3V, and at this time the voltage output from the output end of the charge pump unit 500 is 15.3V.

(4) When the oscillation voltage is 12V, the fourth diode D4 is turned on, and the voltage at the cathode of the fourth diode D4 becomes 27.3V (15.3V+12V). At this time, the voltage output from the output end of the charge pump unit 500 is 27.3V.

After two periods of variation of the oscillation voltage, the charge pump unit 500 can output a stable voltage (27.3V) and transmit the same to the second output end of the power supply unit 100 to ensure that all the thin film transistors in the afterimage elimination unit 200 are in an on state, so as to achieve a complete discharge of the electric charges inside the screen, thereby avoiding the phenomenon of afterimage.

Exemplarily, the charge pump unit 500 may further include a fourth capacitor C4. A first end of the fourth capacitor C4 is grounded, and a second end of the fourth capacitor C4 is electrically connected to the cathode of the fourth diode D4.

Specifically, the fourth capacitor C4 plays the role of storing electric energy, and can discharge to supplement energy, when the voltage at the cathode of the fourth diode D4 is lower than the second preset voltage, and ensure that the voltage output from the output end of the charge pump unit 500 is at the second preset voltage.

Exemplarily, when the screen is turned off, the duration of the oscillation voltage output from the third output end of the power supply unit 100 is at least 10 ms, so as to ensure that the charge pump unit 500 can continuously output the second preset voltage, which enables all thin film transistors in the afterimage elimination unit 200 to be turned on, thereby achieving a complete discharge of the electric charges inside the screen and avoiding the phenomenon of afterimage.

Figure 6:
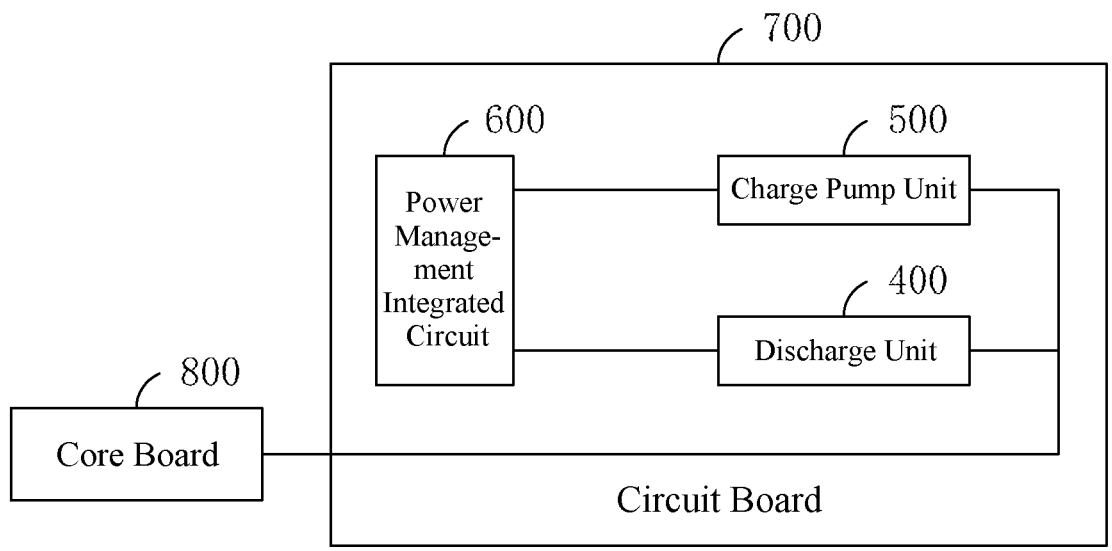
FIG. 6 is a schematic structural diagram of a circuit for eliminating afterimage in accordance with an embodiment of the present application.

In order to clearly illustrate the working principle of the circuit for eliminating afterimage, a specific embodiment is provided below. As shown in FIG. 6, the control unit 300 is arranged on a core board 800, and the power supply unit 100, the discharge unit 400 and the charge pump unit 500 are arranged on the circuit board 700 of the screen. In this embodiment, the power supply unit 100 is a power management integrated circuit 600. The core board 800 is electrically connected to the charge pump unit 500 and the discharge unit 400 in the circuit board 700, respectively. The output end of the charge pump unit 500 is electrically connected to a second output end of the power management integrated circuit 600, and the execution end of the discharge unit 400 is electrically connected to a first output end of the power management integrated circuit 600.

When the screen is turned off, a high-level signal is output from the core board 800, and the discharge unit 400 discharges at the first output end of the power management integrated circuit 600, so that the voltage at the first output end of the power management integrated circuit 600 is fallen rapidly to 1.8V, meanwhile, the charge pump unit 500 outputs a second preset voltage to the second output end of the source management integrated circuit 600 according to the high-level signal. When the voltage of the first output end of the source management integrated circuit 600 is lower than 1.8V, under the action of the second preset voltage, all the thin film transistors in the afterimage elimination unit 200 are in an on state, so that the electric charges in the screen can be fully discharged, and thus the phenomenon of afterimage can be avoided.

When the screen is turned off, the discharge unit 400 can expedite the falling of voltage at the first output end of the source management integrated circuit 600 and improve the activation of the afterimage elimination unit 200. The charge pump unit 500 can ensure a sufficiently high voltage to convert all the thin film transistors in the afterimage elimination unit 200 into an on state, so as to achieve a complete discharge of the electric charge inside the screen and thereby avoiding the phenomenon of afterimage.

In accordance with an embodiment of the present application, a display device is also provided. The display device includes the above-mentioned circuit for eliminating afterimage. When the screen is turned off, a rapid discharge of the electric charges in the screen can be achieved to avoid the phenomenon of afterimage.

The above embodiments are provided only for illustration to the solutions of the present application rather than limitation. Although the present application has been described in detail with reference to the above embodiments, it should be understood for those of ordinary skills in the art that the solutions described in the above embodiments may be modified, or some technical features in the above embodiments may be equivalently replaced, as long as those modifications or replacements do not make the essence of the corresponding solutions deviate from the spirit and scope of the solutions in the embodiments of the present application, then the corresponding solutions should all be included within the protection scope of the present application.

What is claimed is:

1. A circuit for eliminating afterimage, comprising:
an afterimage elimination unit; and
a power supply unit, a first output end and a second output end of the power supply unit being electrically connected to the afterimage elimination unit, respectively; and the afterimage elimination unit is configured to discharge electric charges in a screen by means of a second voltage output from the second output end of the power supply unit, when a first voltage output from the first output end of the power supply unit is lower than a first preset voltage;

wherein the circuit further comprises a discharge unit, a control end of the discharge unit is configured in electric connection with a control unit, and an execution end of the discharge unit is electrically connected to the first output end of the power supply unit, the control unit is configured to output a first control signal when the screen is turned off, and the discharge unit is configured to discharge at the first output end of the power supply unit according to the first control signal to reduce the first voltage; and wherein the circuit further comprises a charge pump unit, a control end of the charge pump unit is configured in electric connection with the control unit, and an input end of the charge pump unit is configured in electric connection with a third output end of the power supply unit, and an output end of the charge pump unit is electrically connected to the second output end of the power supply unit, and the charge pump unit is configured to boost an oscillation voltage output from the third output end of the power supply unit to a second preset voltage according to the first control signal, and transmit the second preset voltage to the second output end of the power supply unit.

2. The circuit for eliminating afterimage according to claim 1, wherein the discharge unit comprises a first resistor, a second resistor and a switch;
a first end of the first resistor serves as the execution end of the discharge unit and is electrically connected to the first output end of the power supply unit; a second end of the first resistor is electrically connected to a drain of the switch; a gate of the switch and a first end of the second resistor are connected in common as the control end of the discharge unit, to be electrically connected to the control unit; and a source of the switch and a second end of the second resistor are both grounded.

3. The circuit for eliminating afterimage according to claim 1, wherein, when the screen is working, a second control signal is output by the control unit, and the second control signal is a low-level signal.

4. The circuit for eliminating afterimage according to claim 1, wherein, when the screen is turned off, the first control signal output by the control unit is a high-level signal within a preset time.

5. The circuit for eliminating afterimage according to claim 4, wherein the preset time is at least 10 ms.

6. The circuit for eliminating afterimage according to claim 1, wherein the charge pump unit comprises a first diode, a second diode, a third diode, a fourth diode, a fifth diode tube, a first capacitor, a second capacitor and a third capacitor;
the fifth diode, the first diode, the second diode, the third diode and the fourth diode are sequentially connected in series;
an anode of the fifth diode serves as the control end of the charge pump unit and is electrically connected to the control unit;
a first end of the first capacitor and a first end of the second capacitor are connected in common as the input end of the charge pump unit, to be electrically connected to the third output end of the power supply unit;

a second end of the first capacitor is electrically connected to a cathode of the first diode and an anode of the second diode, respectively;

a second end of the second capacitor is electrically connected to a cathode of the third diode and an anode of the fourth diode, respectively;

a first end of the third capacitor is electrically connected to a cathode of the second diode and an anode of the third diode, respectively;

a second end of the third capacitor is electrically connected to a cathode of the fifth diode and an anode of the first diode, respectively; and a cathode of the fourth diode serves as the output end of the charge pump unit and is electrically connected to the second output end of the power supply unit.

7. The circuit for eliminating afterimage according to claim 6, wherein the charge pump unit further comprises a fourth capacitor; and a first end of the fourth capacitor is grounded, and a second end of the fourth capacitor is electrically connected to the cathode of the fourth diode.

8. The circuit for eliminating afterimage according to claim 6, wherein the oscillation voltage output from the third output end of the power supply unit is switched between 0V and 12V according to a set frequency.

9. The circuit for eliminating afterimage according to claim 1, wherein, when the screen is turned off, a duration of the oscillation voltage output from the third output end of the power supply unit is at least 10 ms.

10. The circuit for eliminating afterimage according to claim 1, wherein the discharge unit comprises a first resistor, a second resistor and a switch; and a first end of the first resistor serves as the execution end of the discharge unit and is electrically connected to the first output end of the power supply unit; a second end of the first resistor is electrically connected to a drain of the switch; a gate of the switch and a first end of the second resistor are connected in common as the control end of the discharge unit, to be electrically connected to the control unit; and a source of the switch and a second end of the second resistor are both grounded.

11. The circuit for eliminating afterimage according to claim 1, wherein, when the screen is working, a second control signal is output by the control unit, and the second control signal is a low-level signal.

12. The circuit for eliminating afterimage according to claim 1, wherein, when the screen is turned off, the first control signal output by the control unit is a high-level signal within a preset time.

13. The circuit for eliminating afterimage according to claim 12, wherein the preset time is at least 10 ms.

14. A display device, comprising:
a circuit for eliminating afterimage, and the circuit comprising:
an afterimage elimination unit; and
a power supply unit, a first output end and a second output end of the power supply unit being electrically connected to the afterimage elimination unit, respectively; and the afterimage elimination unit is configured to discharge electric charges in a screen by means of a second voltage output from the second output end of the power supply unit, when a first voltage output from the first output end of the power supply unit is lower than a first preset voltage;
wherein the circuit further comprises a discharge unit, a control end of the discharge unit is configured in electric connection with a control unit, and an execution end of the discharge unit is electrically connected to the first output end of the power supply unit, the control unit is configured to output a first control signal when the screen is turned off, and the discharge unit is configured to discharge at the first output end of the power supply unit according to the first control signal to reduce the first voltage; and
wherein the circuit further comprises a charge pump unit, a control end of the charge pump unit is configured in electric connection with the control unit, and an input end of the charge pump unit is configured in electric connection with a third output end of the power supply unit, and an output end of the charge pump unit is electrically connected to the second output end of the power supply unit, and the charge pump unit is configured to boost an oscillation voltage output from the third output end of the power supply unit to a second preset voltage according to the first control signal, and transmit the second preset voltage to the second output end of the power supply unit.

* * * * *